(12) United States Patent
Walker et al.

(10) Patent No.: US 7,783,277 B2
(45) Date of Patent: Aug. 24, 2010

(54) LOW POWER RF CONTROL SYSTEM

(75) Inventors: Winston Glenn Walker, Littleton, CO (US); David A. Saar, Titusville, NJ (US)

(73) Assignee: Somfy SAS, Cluses (FR)

( * ) Notice: Subject to any disclaimer, the term of this patent is extended or adjusted under 35 U.S.C. 154(b) by 703 days.

(21) Appl. No.: 10/807,767

(22) Filed: Mar. 24, 2004

(65) Prior Publication Data
US 2005/0215210 A1    Sep. 29, 2005

(51) Int. Cl.
H04B 1/16    (2006.01)
(52) U.S. Cl. .................................... 455/343.2; 455/354
(58) Field of Classification Search ................ 455/41.1, 455/41.2, 343.1, 343.2, 343.4, 352–354; 318/16; 340/7.32–7.36
See application file for complete search history.

(56) References Cited

U.S. PATENT DOCUMENTS

| | | | |
|---|---|---|---|
| 4,761,830 A | 8/1988 | Izumi | |
| 4,984,281 A | 1/1991 | Matsuhashi et al. | |
| 5,081,402 A * | 1/1992 | Koleda | 318/16 |
| 5,170,108 A | 12/1992 | Peterson et al. | |
| 5,274,499 A | 12/1993 | Shopp | |
| 5,446,453 A * | 8/1995 | Nagamoto et al. | 340/825.2 |
| 5,471,665 A * | 11/1995 | Pace et al. | 455/343.2 |
| 5,528,233 A | 6/1996 | Hansell | |
| 5,537,676 A * | 7/1996 | Panther | 455/315 |
| 5,636,243 A * | 6/1997 | Tanaka | 375/219 |
| 5,793,174 A | 8/1998 | Kovach et al. | |
| 5,909,093 A | 6/1999 | van Dinteren et al. | |
| 6,058,292 A * | 5/2000 | Terreault | 455/78 |
| 6,060,852 A | 5/2000 | Domel et al. | |
| 6,091,162 A | 7/2000 | Williams et al. | |
| 6,128,470 A * | 10/2000 | Naidu et al. | 455/16 |
| 6,181,089 B1 | 1/2001 | Kovach et al. | |
| 6,433,498 B1 | 8/2002 | Domel et al. | |
| 6,486,793 B1 | 11/2002 | Buccola | |
| 6,735,454 B1 * | 5/2004 | Yu et al. | 455/574 |
| 6,829,493 B1 * | 12/2004 | Hunzinger | 455/574 |
| 2003/0015302 A1 | 1/2003 | Pessina et al. | |
| 2003/0215032 A1 * | 11/2003 | Langlais et al. | 375/345 |

FOREIGN PATENT DOCUMENTS

| | | |
|---|---|---|
| EP | 0317007 | 2/1995 |
| EP | 0838574 | 7/2002 |
| JP | 01192987 | 8/1989 |
| JP | 04363495 | 12/1992 |

* cited by examiner

*Primary Examiner*—Nguyen Vo
(74) *Attorney, Agent, or Firm*—Frommer Lawrence & Haug LLP; Ronald R. Santucci

(57) ABSTRACT

A low power rf control system includes a controller that operates at a low clock speed when an associated rf receiver is deenergized and a high clock speed when the controller energizes the receiver. The receiver can be on for a short period, off for a short period if no preamble pulses from a remote control device are received, on for a short period, and then off for a longer period until the next cycle. The receiver remains on to process a command signal when a preamble signal is detected. A DC-DC down converter can be used as a power supply for the receiver, and a SAW resonant circuit can be used as an IF oscillator for the receiver. An LC filter can be associated with the receiver for filtering the IF signal.

79 Claims, 6 Drawing Sheets

LOW POWER RF CONTROL SYSTEM

I. FIELD OF THE INVENTION

The present invention relates generally to radio-frequency (rf) control systems for controlling such things as window coverings, awnings, security screens, projection screens, lighting systems and controls, battery operated radios, televisions, and stereos, and the like.

II. BACKGROUND

Window coverings that can be opened and closed are used in a vast number of business buildings and dwellings. Examples of such coverings include horizontal blinds, vertical blinds, pleated shades, roll-up shades, and cellular shades made by, e.g., Spring Industries®, Hunter-Douglas®, Levellor®, and Somfy®. It is to be understood that while the remote control of window coverings is envisioned and used as one exemplary application, the principles set forth herein may be applied to other systems, including, without limitation, awnings, security screens, projection screens, lighting systems and controls, battery operated radios, televisions, and stereos, and the like wherein conservation of battery power is desired.

Several effective systems for advantageously either lowering or raising a window covering, or for moving the slats of a window covering between open and closed positions, have been provided. Such systems are disclosed in U.S. Pat. Nos. 6,189,592, 5,495,153, and 5,907,227, incorporated herein by reference. These systems include a motor driven gear box that is coupled to a tilt rod or roller tube of the window covering. When the motor is energized, the tilt rod (or roller tube) rotates clockwise or counterclockwise. These systems can be, e.g., operated via a remote control unit. Typically, these remotely operated systems include an infrared (IR) transmitter in the remote control unit and an IR receiver in an actuator that is mechanically coupled to the blinds. In most cases, the receiver remains awake constantly or pulses between on and off. Thus, when a signal is sent by the transmitter, the receiver can receive it, but in the case of pulsed receivers, only when the receiver is in the "on" state. The receiver can require a relatively high amount of current in order to properly operate. As a result, if the receiver is powered by a direct current power source such as a battery it can quickly drain the battery. On the other hand, continuously pulsing the receiver between power on and power off can help increase battery life, but the battery still can relatively quickly lose power, since the duty cycle between "off" and "on" must be relatively short, to avoid missing a user signal. Even then, unacceptable delay can exist from when a user toggles a control button on the remote and the window covering starts to move.

Accordingly, the present invention recognizes a need for a control system for a motorized window covering that further conserves power, and that has a short response time.

SUMMARY OF THE INVENTION

A radio-frequency (rf) control system for a component such as but not limited to window coverings, awnings, skylight covers, and screens, includes a remote control device that is manipulable by a user to transmit a wireless rf signal. An rf receiver is associated with the component and is configured for processing the rf signal. Also, a controller is associated with the component for controlling the receiver. The controller saves power by only periodically energizing the receiver. In one embodiment, the remote transmits a series of preamble pulses prior to transmitting a command signal. In this embodiment, the controller causes the receiver to be energized for a first energized period, then to deenergize for a short period if no preamble signal is detected, then to energize for a second energized period, and then to deenergize, if no preamble signal is detected, for long period longer than the short period, prior to once again reenergizing the receiver.

Or, assuming that the preamble pulses repeat, e.g., every five milliseconds, a first receiver energization might be needed to sample whether a preamble is detected. Recognizing that a failure to detect the preamble could mean that no preamble has been transmitted by the remote but could also mean that the receiver was energized during an off period of an existing preamble, the receiver can be energized a second time after a rest period the length of which ensures detection in at least one of the time periods of a preamble pulse if a preamble has been generated.

In another embodiment, the remote transmits a single long preamble pulse (of, e.g., sixty milliseconds) prior to the command signal, and the controller energizes the receiver temporarily sometime within the period of the preamble pulse. In any case, once a preamble is sensed, the receiver remains energized to detect the ensuing command signal.

In a preferred embodiment, the preamble signal includes plural pulses, with each pulse having a duty cycle in excess of fifty percent (50%). The preamble includes at least six pulses and more preferably twelve pulses.

As set forth further below, in some embodiments the controller operates at a low clock frequency during at least most of the long period and at a high clock frequency at least when the receiver is energized. The controller may operate at an intermediate frequency between the low and high frequencies just prior to energizing the receiver after the long period, if advantageous to the controller.

If desired, at least one bypass capacitor can be electrically connected to the receiver and to ground. As recognized herein, the time to charge a receiver's bypass capacitors varies with capacitance, with larger capacitors yielding better receiver performance once charged but requiring more time to charge and, hence, more delay in rendering the receiver operational. Accordingly, in a preferred embodiment the bypass capacitor can have a capacitance of below five hundred picoFarads (500 pF). Plural bypass capacitors may be provided with at least one having a capacitance not substantially more than one hundred picoFarads (100 pF). We have found that these small capacitances permit faster receiver response time without unduly reducing receiver performance.

Further, some embodiments may use a surface acoustic wave (SAW) resonator circuit to establish an intermediate frequency (IF) oscillator for the receiver. An LC filter can be associated with the receiver for filtering an IF signal, when a SAW resonator is used. Also, the component can be powered by at least one battery, and the system can include a DC-DC down converter electrically interposed between the battery and receiver to provide a voltage to the receiver with a significant reduction in battery drain at minimal power loss.

In another aspect, a radio-frequency (rf) control system for a component includes a remote control device manipulable by a user to transmit a wireless rf signal, and an rf receiver associated with the component and configured for processing the rf signal. A controller controls the receiver. The controller operates at a low clock frequency during at least most of a receiver sleep period and at a high clock frequency at least when the receiver is energized.

In still another aspect, a radio-frequency (rf) control system for a component includes a remote control device manipulable by a user to transmit a wireless rf signal, and an rf receiver associated with the component and configured for processing the rf signal. A controller controls the receiver. At least one bypass capacitor is electrically connected to the receiver and to ground. The bypass capacitor has a capacitance of below five hundred picoFarads (500 pF).

In yet another aspect, a radio-frequency (rf) control system for a component includes a remote control device manipulable by a user to transmit a wireless rf signal, and an rf receiver associated with the component and configured for processing the rf signal. A controller controls the receiver. A surface acoustic wave (SAW) resonator circuit establishes an intermediate frequency (IF) oscillator for the receiver. As recognized herein, such a filter advantageously starts up faster than a conventional phase-locked loop oscillator.

In another aspect, a radio-frequency (rf) control system for a component includes a remote control device manipulable by a user to transmit a wireless rf signal, and an rf receiver associated with the component and configured for processing the rf signal. A controller controls the receiver. The present invention recognizes that the system battery might provide a higher voltage than is needed for the receiver. Accordingly, a DC-DC down converter can be electrically interposed between the battery and receiver to provide a voltage to the receiver.

In another aspect, a radio-frequency (rf) control system for a component includes a remote control device manipulable by a user to transmit a wireless rf signal, and an rf receiver associated with the component and configured for processing the rf signal. A controller controls the receiver. The controller adaptively adjusts a noise threshold above which a carrier must be detected to indicate the presence of a control signal. The present invention understands that this feature reduces the amount of time that the receiver undesirably is energized in response to noise rather than desired signals from the transmitter.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
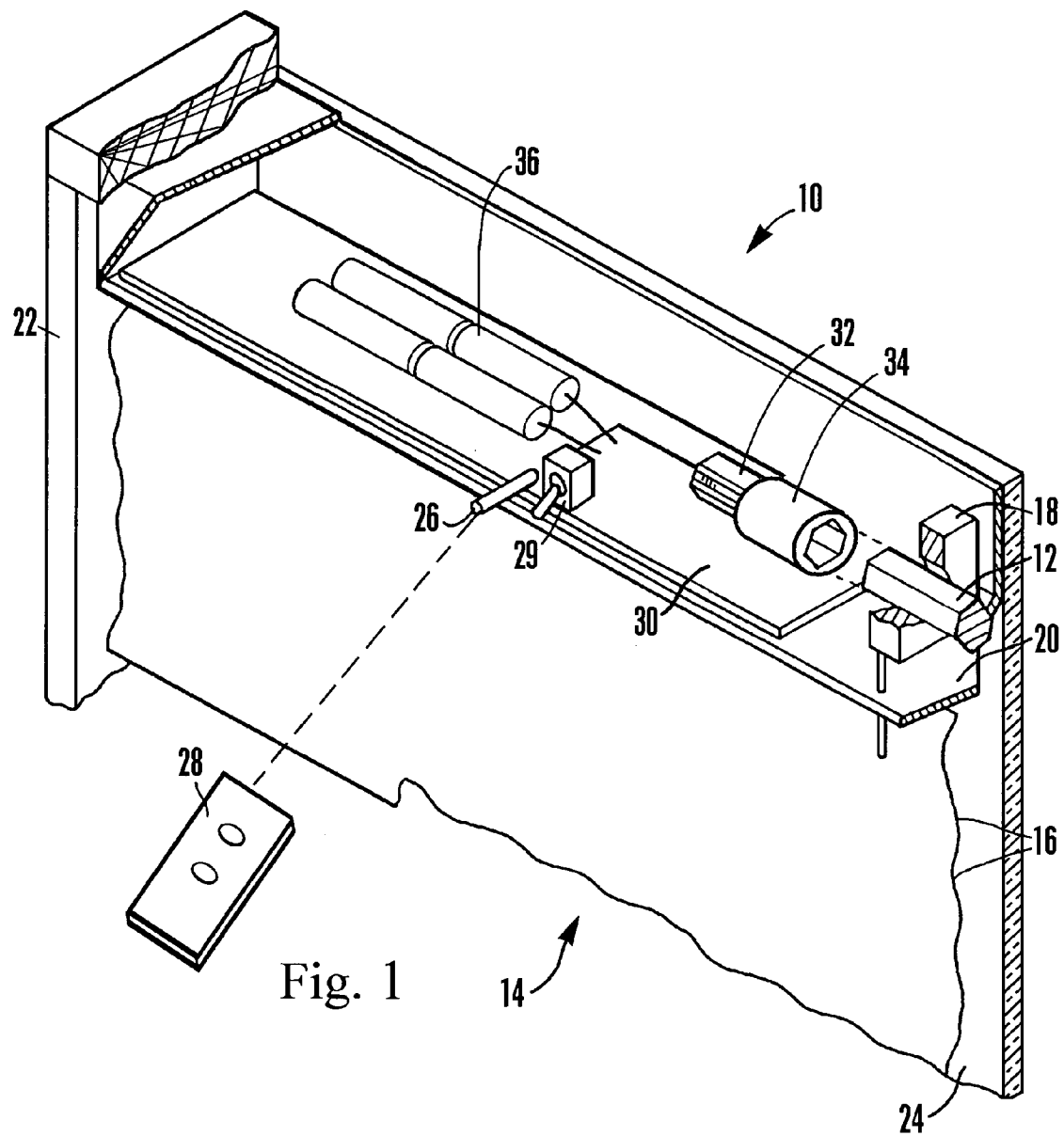
FIG. 1 is a perspective view of a window covering actuator, shown in one intended environment, with portions of the head rail cut away.

Referring initially to FIG. 1, for illustration purposes a motorized window covering is shown, generally designated 10, that includes an actuator such as a rotatable rod 12 of a window covering 14, such as but not limited to a shade assembly having raisable (by rolling up) and lowerable (by rolling down, or unrolling) shade 16. As shown, the tilt rod 12 is rotatably mounted by means of a block 18 in a head rail 20 of the window covering 14. In some embodiments the tilt rod 12 is a tube.

While a roll-up shade is shown as but one non-limiting example of an application of the present low power rf control system, it is to be understood that the rf control system disclosed herein can be used in a wide range of other applications to control devices sought to be controlled. For example, the invention applies to raisable and lowerable pleated shades and cellular shades such as those commonly marketed under the trade names "Silhouette", "Shangri-La", etc. as well as to projector screens, awnings, etc. that can be raised and lowered. Moreover, the invention may also apply to tilt-only systems. Thus, for example, the rod 12 may be a roll-up rod of a shade, awning, or projector screen or security screen, or a tilt rod of a horizontal (or vertical) blind, or other like operator. It is thus to be further understood that the principles of the present invention apply to a wide range of window coverings and other objects including, but not limited to the following: vertical blinds, fold-up pleated shades, roll-up shades, cellular shades, skylight covers, etc. Powered versions of such shades are disclosed in U.S. Pat. No. 6,433,498, incorporated herein by reference. Still further, the rf control system can be used to control lighting systems and controls, as well as battery operated radios, televisions, and stereos, and the like.

In the non-limiting illustrative embodiment shown, the window covering 14 is mounted on a window frame 22 to cover a window 24, and the rod 12 is rotatable about its longitudinal axis. The rod 12 can engage a user-manipulable baton (not shown). When the rod 12 is rotated about its longitudinal axis, the shade 16 raises or lowers between an open configuration and a closed configuration.

FIG. 1 shows that the actuator 10 can include a control signal generator, preferably a signal sensor 26, for receiving a user command signal. Preferably, the user command signal is generated by a hand-held user command signal generator 28, which is a radio-frequency (RF) remote-control unit operating at, e.g., between one hundred MegaHertz and one thousand MegaHertz and perhaps between four hundred and five hundred megaHertz (400 MHz-500 MHz), more preferably at 433 MHz, and more preferably still at 433.42 MHz. The user command signals can include open, close, raise, lower, and so on. A manual operation switch 29 can also be provided for locally operating the motor disclosed below.

An electronic circuit board 30 can be positioned in the head rail 20 and can be fastened to the head rail 20, e.g., by screws (not shown) or other well-known method. The preferred electronic circuit board 30 includes the below-described microprocessor or controller for processing the control signals. Also, the circuit board 30 includes an rf receiver as set forth further below that is connected to controlled by the microprocessor or controller.

FIG. 1 shows that a small, lightweight electric motor 32 is coupled to a gear enclosure 34, preferably by bolting the motor 32 to the gear enclosure 34. The gear enclosure 34 is keyed to the rod 12, so that as the gears in the gear enclosure 34 turn, the rod 12 rotates.

It is to be understood that the motor 32 is electrically connected to the circuit board 30. To power the motor 32, one or more (four shown in FIG. 1) primary dc batteries 36, such as type AA alkaline batteries or Lithium batteries, can be mounted in the head rail 20 and connected to the circuit board 30. Preferably, the batteries 36 are the sole source of power for the motor, although the present invention can also be applied to powered shades and other objects that are energized from the public ac power grid.

As more fully disclosed below, a user can manipulate the signal generator 28 to generate a signal that is sensed by the signal sensor 26 and sent to signal processing circuitry in the circuit board 30. In turn, the electrical path between the batteries 34 and the motor 32 is closed to energize the motor 32 and move the window covering open or closed in accordance with the signal generated by the signal generator 28, under control of the processor on the electronic circuit board 30.

In the case of other systems, the processor on the circuit board 30 might, for instance, energize a lighting system when an appropriate command signal is received, or raise or lower an awning or screen, or activate or deactivate a battery-operated radio, TV, or stereo, in accordance with present principles.

Figure 2:
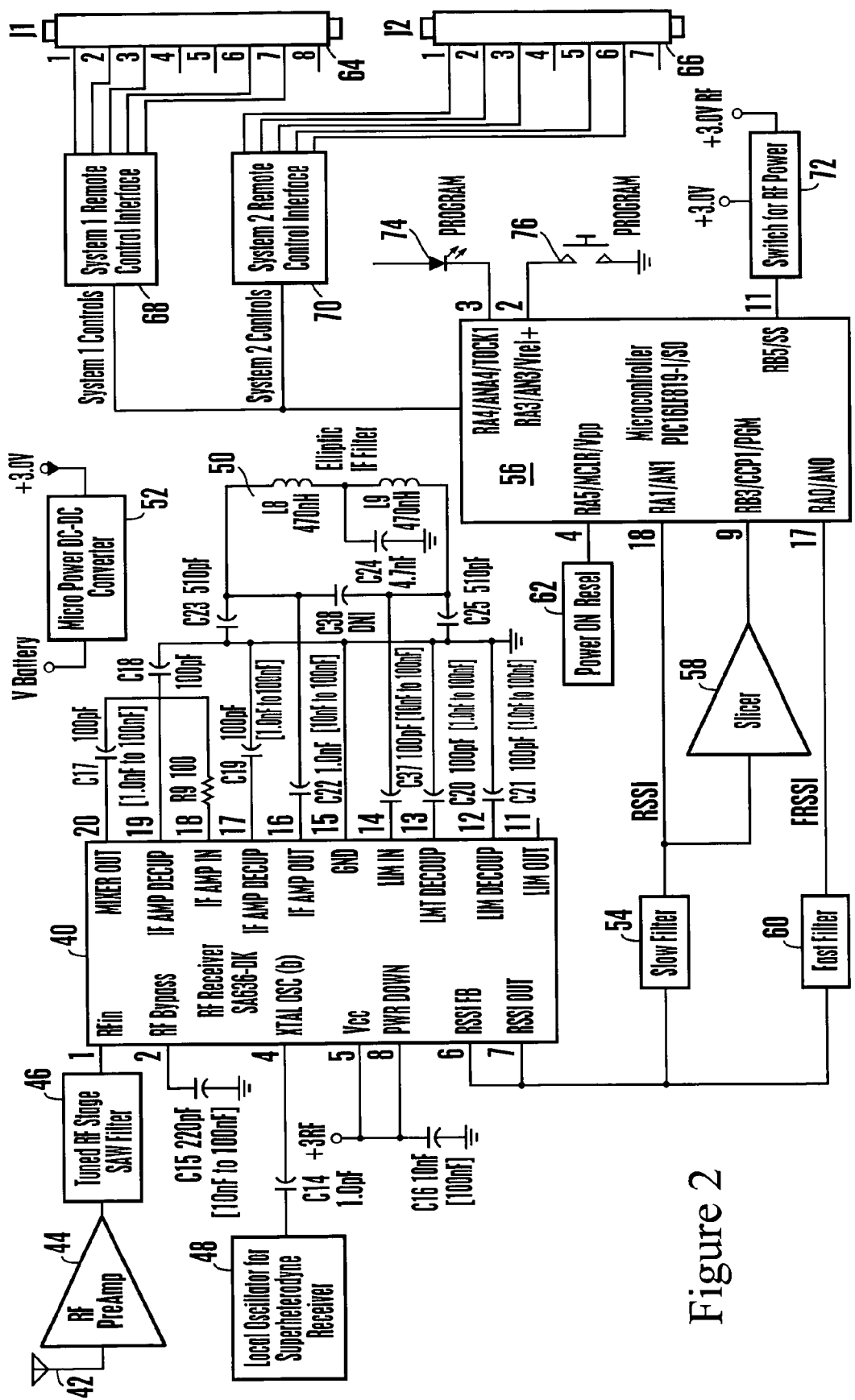
FIG. 2 is a block diagram showing the receiver and controller of the present invention.

Now referring to FIG. 2, the receiver, controller, and supporting circuitry on the circuit board 30 in the device being controlled can be seen. In overview, the present receiving system shown in FIGS. 2 and 3 uses very low power, and thus significantly prolongs battery life. As set forth further in detail below, in the exemplary non-limiting embodiment and owing to the inventive features herein, the receiver is very sensitive and it turns ON, completely stabilizes, and starts receiving signals in only seventy microseconds.

A rf receiver 40 is shown that is connected to an antenna 42 through a preamplifier 44 and a surface acoustic wave (SAW) filter 46 in accordance with rf principles known in the art. The non-limiting exemplary rf receiver 40 is a Phillips superheterodyne SA636 receiver integrated circuit. Accordingly, while details of its pins and pin connections are shown in FIG. 2, only the salient modifications of the present invention will be discussed, it being understood that the principles set forth herein generally apply to other receivers as well.

As shown, the receiver 40 includes a local oscillator 48 for downconverting the rf signal to IF. The Local oscillator 48 can be a conventional phase locked loop (PLL) synthesizer but in the preferred embodiment the Local oscillator 48 is established by a surface acoustic wave (SAW) resonator circuit, which can start up much faster than a PLL synthesizer and, as recognized by the present invention, consequently save energy by reducing start up time. The SAW resonator circuit preferably can start up in ten to fifteen microseconds.

As also recognized herein, however, it might happen that an available SAW resonator circuit does not provide sufficient frequency separation that otherwise would be required to allow the use of off-the-shelf IF filters. Accordingly, in the preferred embodiment an LC filter 50, preferably a discrete elliptic LC filter with low value coupling capacitors C23, C25, is associated with the receiver 40 for filtering the IF signal. The LC filter 50 includes first and second inductors L8, L9 (with exemplary non-limiting inductances, in Henries, indicated in FIG. 2) in series with the coupling capacitors C23, C25 and in parallel with a circuit capacitor C38. A ground capacitor C24 can be located in series between a tap between the inductors and ground as shown.

Furthermore, the preferred receiver 40 is associated with bypass capacitors C15, C17, C18, C19, C22, C37, C20, and C21 that connect the receiver 40 to ground as shown and that have inventively low capacitances, much lower than the conventional capacitance of one tenth of a microfarad for the particular exemplary rf receiver 40 design shown. More particularly, in the non-limiting embodiment shown the bypass capacitor C15 has a capacitance of two hundred twenty picoFarads (220 pF), and the remaining bypass capacitors have capacitances of one hundred picoFarads (100 pF). The present invention has discovered that these low capacitances allow for much faster start up time of the receiver 40 without, as might otherwise be expected, unduly degrading receiver sensitivity.

Additionally, the rf receiver 40 preferably is powered by three volts direct current (3 vdc) produced by a DC-DC down converter 52 that is interposed between the batteries shown in FIG. 1 and the receiver 40. The details of the converter 52 are set forth more fully in reference to FIG. 5 below. Less desirably, a series regulator could be used as a DC-DC converter, or the receiver can be powered directly from a three volt battery or so-called "coin cell". The preferred converter set forth below is preferred because it converts battery voltage to three volts usable by the receiver 40 with little power loss, further prolonging battery life.

Thus far, the components discussed above are in the main related to rapidly energizing the rf receiver 40 to reduce start up time of the receiver and, hence, to conserve power. FIG. 2 also shows components, however, that function to process command signals received from the remote control device 28 in FIG. 1 when the receiver 40 is energized. To understand how these components of FIG. 2 work, temporary reference is made to FIG. 3.

To provide compatibility with a system which may provide a preamble of six or twelve preamble (pre-synchronization, non-data command) pulses of 45% to 55% duty cycle at the rate of 200 pulses per second, a preferred embodiment might be implemented wherein the remote control device transmits twelve preamble pulses at a 55% duty cycle. Other pulses rates and numbers of pulses may be used. The governing criteria can include the acceptable time delay between operator command and system response, the amount of this delay period that can be allocated to the preamble, and the duty cycle that is permitted. For example, a single long preamble pulse of, e.g., sixty milliseconds can be used, in which case the receiver need be powered up to sample only once during the period, or sixty pulses at a rate of 1000 pulses per second and a duty cycle of 55% can be used.

Figure 3:
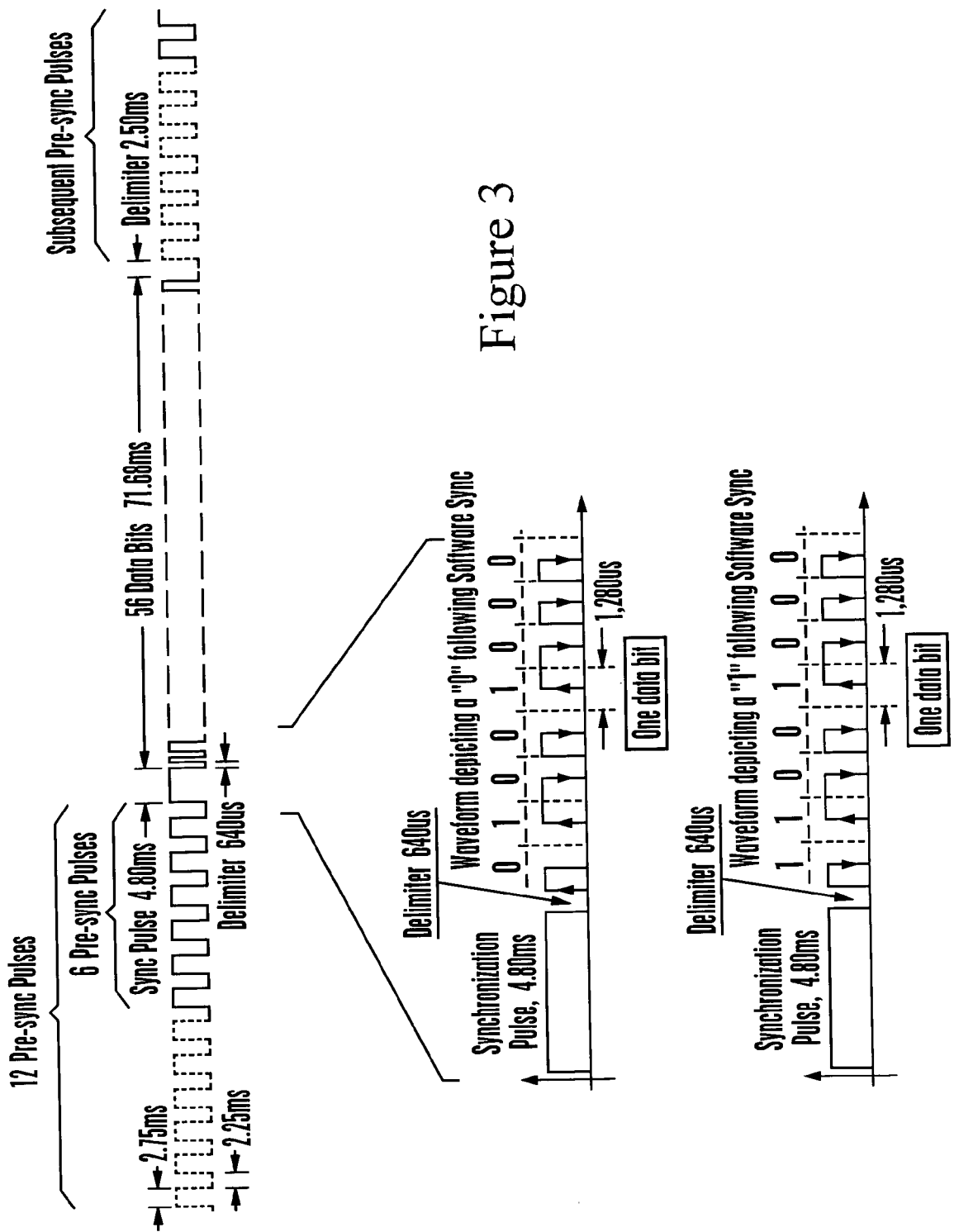
FIG. 3 is a schematic diagram of the signals from the remote control unit in a first paradigm.

In the particular embodiment shown in FIG. 3, wherein twelve pulses at a duty cycle of 55% are used, the signal from the remote control device 28 (FIG. 1) can include plural preamble pulses (labelled "pre sync" in FIG. 3) followed by a single synchronization pulse (labelled "sync" in FIG. 3) and a long encoded control signal, which can be a 56 bit Manchester encoded signal. Six to twelve preamble pulses may be used in some non-limiting embodiments. The preamble pulses have duty cycles in excess of fifty per cent, and preferably have duty cycles of around 55%. In one embodiment, to achieve this each preamble pulse can be 2.75 ms in length with 2.25 ms between pulses. The synchronization pulse can be 4.8 ms in length and can be separated from the last preamble pulse by 640 µS. After the encoded control signal is sent, 62.5 ms can elapse to the start of the next synchronization pulse.

Those skilled in the art will appreciate that the above-described amplitude shift keying, or on-off keyed, modulation permits sampling the receiver as rarely as possible for power conservation while ensuring that at least part of the preamble is detected to indicate a control signal is about to be received.

As mentioned above, however, other preamble pulse generation and detection paradigms can be used. If the remote can transmit, prior to the command signal, a single long preamble pulse, for instance, of around sixty milliseconds, the controller can energize the receiver temporarily sometime within the period of the preamble pulse. In any case, once a preamble is sensed, the receiver remains energized to detect the ensuing command signal.

Figure 4:
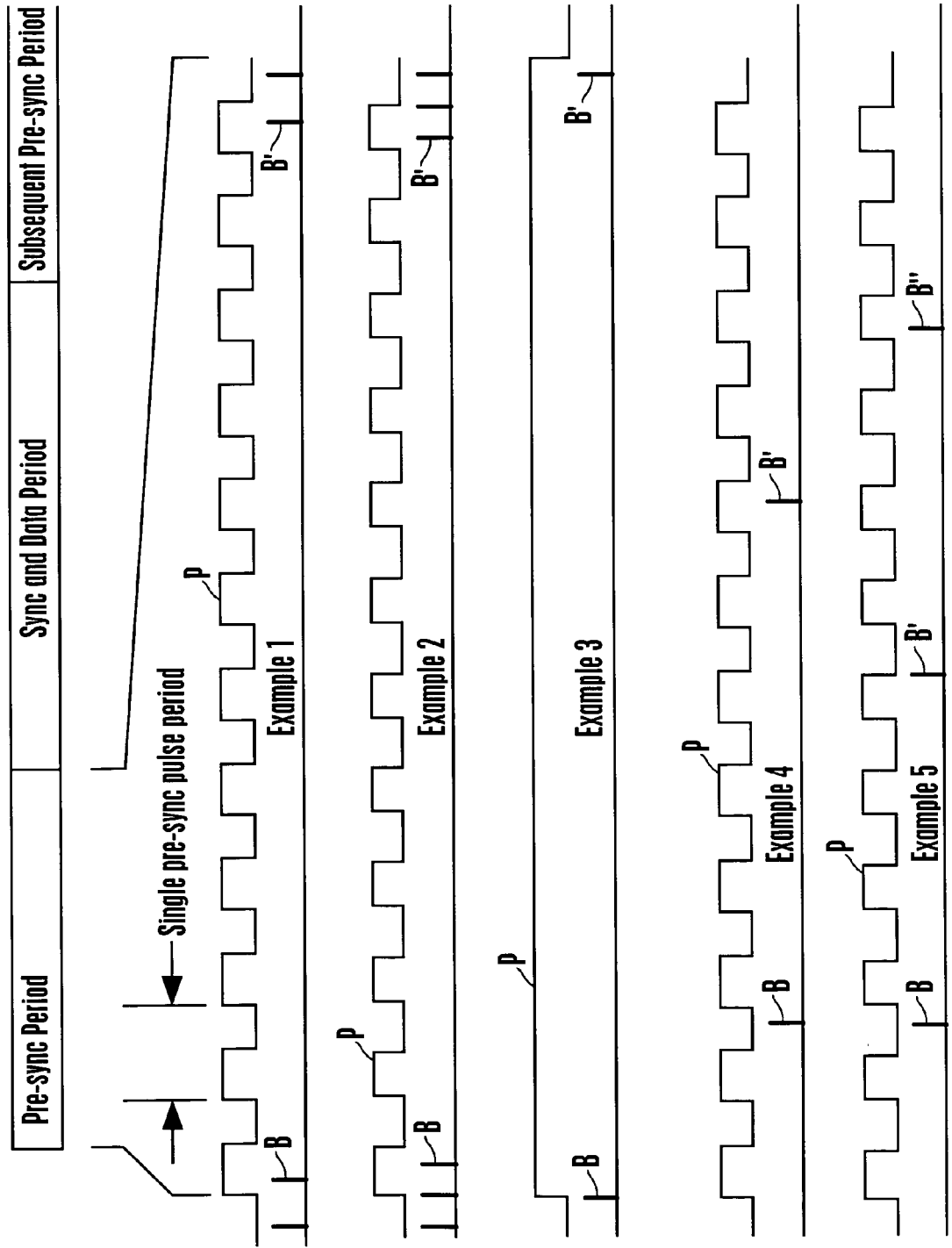
FIG. 4 is a schematic diagram of the signals from the remote control unit in additional paradigms.

Additional examples of preamble pulse generation and detection paradigms are shown in FIG. 4, the various examples of which show a series of preamble pulses "P" having a period (labeled "single pre-sync pulse period" in example 1), e.g., of five milliseconds, for illustration. In Example 1, twelve presynchronization pulses "P" at a duty cycle of 55% are generated by the remote control device. Wake-up bars "B" represent when the receiver is energized by the controller. As shown in Example 1, the wake-up events occur in groups of twos. In example 1, the wake-up bars "B" of a group are paired one-half of one pulse period apart. This ensures that if the first wake-up event occurred when no pulse "P" was being transmitted but a signal from the remote control device nonetheless has been generated by a user, the second wake-up event will occur during (and, hence, the receiver will detect) a subsequent pulse "P", owing to the 55% pulse duty cycle. The next group of two wake-up events B' occurs before the end of the length of an entire presynchronization cycle period as shown in FIG. 4.

Example 2 shows much the same paradigm except that the pulse "P" operate at only a 45% duty cycle. In this example, the receiver wake-up events occur in groups of threes, with the wake-up events of a group spaced one-third of a pulse period apart from each other, to ensure detection of a pulse "P" if the user has generated a command signal using the remote control device. The next group of two wake-up events B' occurs before the end of the length of an entire presynchronization cycle period as shown in FIG. 4.

Example 3 shows yet another paradigm wherein only a single long presynchronization pulse "P" is generated by the remote control device, and two receiver wake-up events B, B' are generated over a time span that is less than the pulse period. It may now be appreciated that in all three of the first three examples shown in FIG. 4, plural groups of wake-up events occur within the total time span of the presynchronization signal, also referred to herein as a "preamble", with plural events of a single group occurring within a single pulse period.

Examples 4 and 5 in FIG. 4 show paradigms wherein plural wake-up events occur within the total time span of the presynchronization signal but only a single wake-up event occurs within any given pulse period. In example 4, twelve pulses "P" are generated by the remote control device at a duty cycle of 55%, with two receiver wake-up events B, B' per cycle being temporally spaced from each other less than one-half of the total presynchronization signal period as shown. In contrast, in Example 5 twelve pulses "P" are generated by the remote control device at a duty cycle of 45%, with three receiver wake-up events B, B', B" being temporally spaced from each other less than one-third of the total presynchronization signal period as shown.

Referring back to FIG. 2, a slow receiver signal strength indicator filter 54 and a fast receiver strength indicator filter 60 are connected to the receiver 40 and to a controller 56, for processing as follows prior to analysis by the controller 56 discussed below in reference to FIG. 6. Both filters 54, 60 can be implemented by Salen key filters, with the slow filter 54 having a time constant of, e.g., two hundred microseconds (200 μs) and the fast filter 60 having a time constant of, e.g., ten microseconds (10 μs). The output of the fast filter 60 is used by the microcontroller 56 to determine whether a carrier signal has been detected. When a carrier signal is detected, the microcontroller 56 uses the output of the slow filter 54 to detect the continued presence (or not) of a signal to reduce the effect of noise. A comparator 58 that is connected to the microcontroller 56 receives the output of the slow filter 54 to provide a digital signal to the microcontroller 56. This is often referred to as a "slicer".

Turning to the controller 56, in a non-limiting embodiment the controller 56 may be implemented by an IC type 16LF819-I/SO made by Microchip Technologies, it being understood that the present principles apply to any controller (which may be variously referred to as a "microcontroller", "processor", "microprocessor", or "central processing unit") that functions as set forth herein. As shown, a power on reset circuit 62 can be provided to reset the controller 56 when it is initially powered on.

As intended herein, not only does the controller 56 process the signal from the receiver 40 to determine how to control, e.g., systems 64, 66 (such as component motors, light switches, etc.) having respective interfaces 68, 70, but it also turns the receiver 40 on and off in accordance with disclosure below. To this end, a switch 72, which can be implemented by a PNP transistor, is provided that is selectively closed by the controller 56 to connect the voltage from the converter 52 ("+3.0V" in FIG. 2) to the receiver 40 (as indicated in FIG. 2 by the "3V RF" pin) when the logic below determines to turn on the receiver 40. Also, the controller 56 may be programmed to accept commands from a particular remote control device. In this case, a program light emitting diode (LED) 74 can be illuminated by the controller 56 when a user simultaneously depresses a program pushbutton 76 with appropriate manipulation of the remote control device 28 shown in FIG. 1, to indicate that the signal from the remote control device 28 is stored by the controller 56 for future recognition.

The specific type of component control logic afforded by the controller 56 varies from component to component, and is not central to the present low power rf control system. Details of one type of control logic that the controller 56 can implement in the context of roll-up shades are set forth in U.S. Pat. No. 6,060,852, incorporated herein by reference. Other types of control paradigms can be used to respond to user-generated command signals from the remote control device 28, e.g., simple "open" and "close" commands for window coverings, "up" and "down" commands for screens, and "on" and "off" commands for lighting systems, radios, TVs, and other electronic or electric components. The controller 56 decodes data in the control signal based on the timing of pulses therein.

Figure 5:
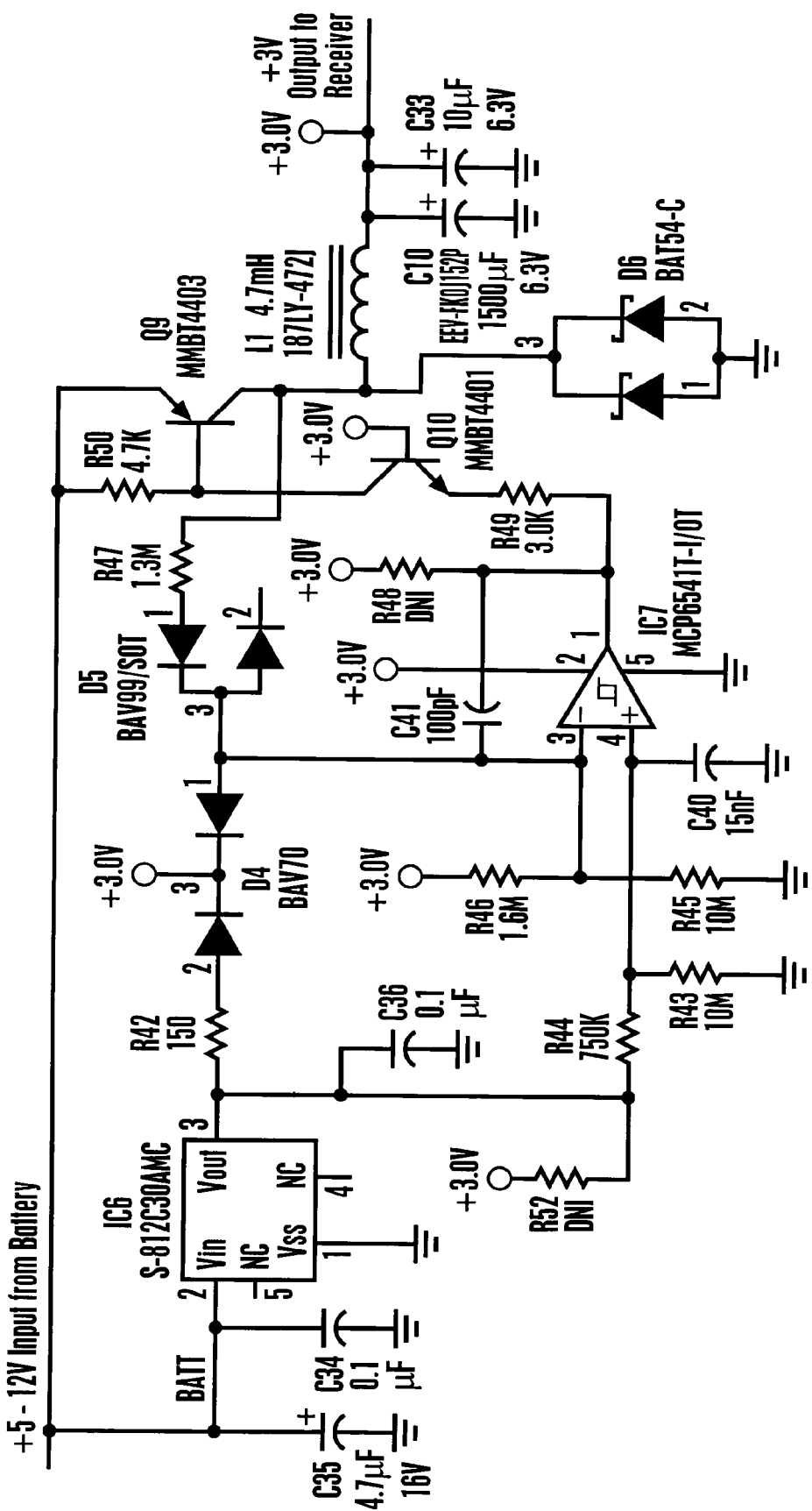
FIG. 5 is a circuit diagram of the preferred DC-DC converter.

Before detailing how the controller 56 controls the receiver 40 to reduce power consumption, reference is made to the circuit diagram in FIG. 5 of a preferred non-limiting DC-DC converter 52, which, it will be recalled, operates to convert battery voltage to three volts for use by the receiver 40, with minimal power loss. The specifications for the preferred non-limiting converter 52 are:

| | |
|---|---|
| a. Input Voltage: | 5 V to 14 V |
| b. Output Current: | 0 mA to 15 mA |
| c. Efficiency: | 70% minimum at 50 uA out |
| | 80% minimum at 15 mA out |

The present invention makes the following observations regarding the advantages of using a DC-DC converter. It is desirable to operate small shades for about four years using an "AA" battery, which provides an average current for the period of about seventy five microAmperes (75 μA). Were a linear regulator instead of a DC-DC converter used to power the receiver, it would consume about fifty microAmps, and the shade controller another ten microAmps, leaving only fifteen microAmps to drive the shade. If the small shade is completely raised and lowered once a week, the average current required is about seven microAmps, so the battery will last four years if the shade is operated no more than twice per week. Use of a DC-DC down converter, however, results in reducing receiver current requirements to less than twenty microAmps, enabling about three times as much operation over a four year period. For this reason, the DC-DC converter is preferred in the exemplary non-limiting embodiment.

Referring to the schematic diagram of FIG. 5, the non-limiting exemplary DC-DC converter 52 operates as follows. "IC6" on the left hand portion of the circuit is a micropower linear regulator that provides power the circuit before the converter 52 begins to operate, via resistor R61 and pin 2 of the dual diode D4. Also, the regulator "IC6" provides a reference voltage for pin 4 of the comparator IC7 via resistors R44 and R43. When the feedback from the +3.0V provided by resistors R46 and R45 is lower than the reference voltage, the output of the comparator is driven low, turning transistors Q10 and Q9 ON, raising the input to inductor L1 to the battery voltage. This causes current to start to flow through inductor L1, charging the output filter capacitors, C10 and C33. Capacitor C41 provides AC hysterisis to keep the output of comparator IC7 low until the charge drains off of capacitor C41. After a time determined primarily by the time constant formed by capacitor C41 and resistors R46 and R45, pin 3 rises above pin 4 of comparator IC7, driving the output of comparator IC7 high, which turns OFF transistors Q10 and Q9. This interrupts the flow of current though transistor Q9. However, inductor L1 opposes any abrupt change of current flowing through is, so the input of inductor L1 is lowered until it finds another source of current. Just after, it passes ground potential, the two diodes in D6 turn ON to provide a source of current. The voltage across the inductor, which was positive on the input, is now negative, about 3.3V, slowing and ultimately stopping the flow of current. When this current stops, the input of inductor L1 rises, the diodes D6 turn OFF, and eventually the voltage across the inductor is zero. The charge that flowed through inductor L1 is stored in capacitors C10 and C33. Because of the large capacitance of capacitor C10, the change in voltage in the output +3.0V is less that 3 mV, providing excellent regulation to the pulse loads required by the receiver 40.

Because of the wide range of battery voltages used in the various controlled devices, a second feedback path can be provided to supplement the path through resistor R46. If inductor L1 were always connected to the battery for a fixed period, regardless of battery voltage, then the amount of charge transferred from the battery to the output capacitors would vary as the square of the voltage across inductor L1. If the time that inductor L1 is connected to a low battery voltage is adequate to provide the current to operate the receiver 40, at high battery voltages, inductor L1 would saturate, defeating the purpose of the converter. Accordingly, the second feedback path is provided by resistor R47 and diode D5. This feedback is proportional to the battery voltage, but only during the time that transistor Q9 is conducting, so that the time that transistor Q9 conducts with a high battery voltage is much shortened compared to a low battery voltage. The purpose of the diode on pin 1 of D4 is to prevent the voltage on pin 3 of comparator IC7 from rising excessively above the supply voltage, which if it were allowed to do might damage comparator IC7. Capacitor C40 provides a filter for the reference voltage to pin 4 of comparator IC7, keeping the voltage free of noise. Capacitor C36 is an output capacitor required to stabilize the comparator IC7.

Accordingly, in the preferred non-limiting embodiment shown, the converter 52 operates efficiently over a wide range of loads because:

a. very small reference and feedback currents are used—280 nA.each.
b. a low current comparator is used, typically 600 nA
c. minimal switch drive current, 400 nA, on average is used
d. a low forward voltage in D6 is used
e. high product of inductor time constant times its saturation current is used It is also preferred to have a storage capacitor (C10) with low equivalent series resistance (ESR) to minimize the ripple voltage on the output.

Figure 6:
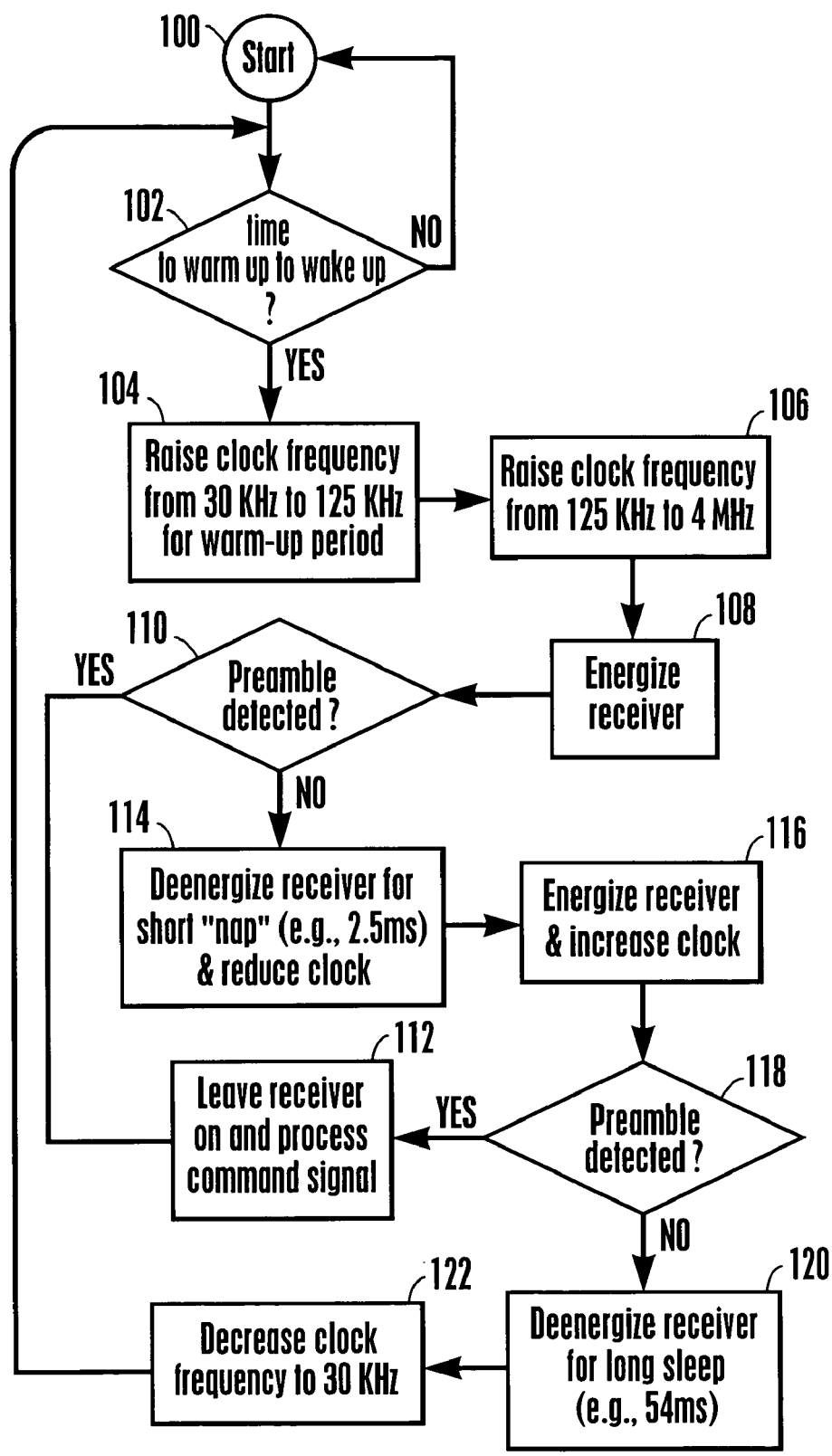
FIG. 6 is a flow chart of the present logic.

Now referring to FIG. 6, the details of the preferred logic used by the controller 56 to energize and deenergize the receiver 40 may be seen. As intended by the present invention, when the user toggles a command button on the remote control device 28 shown in FIG. 1, an rf command signal is generated that is preceded by a repeating preamble (indicating a carrier) indicating that command data is to follow. The preferred preamble includes plural pulses, each having a period of five milliseconds and a duty cycle in excess of fifty percent (50%), e.g., each pulse can have a duty cycle of 55%. The preamble includes at least six pulses and more preferably includes twelve pulses. The preamble is periodically transmitted in accordance with disclosure below.

With this in mind, the logic to control energizing the receiver 40 begins at state 100 and proceeds to decision diamond 102, wherein it is determined whether it is time to wake up (energize) the receiver. If it is, the logic continues to block 104 to raise the clock frequency of the controller 56, which runs at 30 KHz while the receiver 40 is in the long sleep period, to an intermediate frequency, e.g., 125 KHz. The clock runs at this intermediate frequency for a predetermined start up time, e.g., two milliseconds, at which point the logic moves to block 106 to raise the clock frequency to 4 MHz. The receiver is then energized at block 108 for a short wake-up time period, e.g., eighty microseconds, taking advantage of the components discussed in reference to FIG. 2 to rapidly achieve operating effectiveness.

The reason for the above operation is that as recognized herein, the controller 56 must be completely ready to analyze the output of the receiver 40 during the period when the receiver 40 is powered, which requires the controller to run at a 4 MHz clock frequency. However, when running at this frequency, comparatively much power is consumed, so that when the receiver is not energized the controller operates at only 30 KHz, conserving power. But as further understood herein, the controller 56 has a start up time of, e.g., two milliseconds when transitioning from 30 KHz to a higher frequency, but can almost instantaneously move from an intermediate frequency (e.g., of 125 KHz) to the high frequency (e.g., 4 MHz) required for processing signals from the receiver 40. Running at the high frequency during this start up time, as recognized herein, consumes too much power. Accordingly, the controller 56 operates at the intermediate frequency during the start up time to further conserve power, and then, once transitioning has been completed, operates at the requisite high frequency.

When the receiver 40 is energized at block 108, the logic moves to decision diamond 110 to determine whether a preamble has been detected during the wake-up time. If so, the receiver remains energized at block 112, and the command signal from the remote control device 28 is processed by the controller 56 as appropriate to cause the controlled device 64 and/or 66 to undertake the action represented by the command signal. The logic then ends, to recommence at start state 100 upon completion of the command.

In contrast, when no preamble is detected at decision diamond 110 during the wake up period, the receiver 40 is deenergized and the oscillator returned to the intermediate frequency at block 114 for a short "nap" period of, e.g., two and a half milliseconds. After its nap the receiver 40 is again energized for a short wake up period at block 116, with the clock speed being increased to the high frequency.

When the receiver 40 is energized at block 116, the logic moves to decision diamond 118 to determine whether a preamble has been detected during the wake-up time. If so, the receiver remains energized at block 112, and the command signal from the remote control device 28 is processed by the controller 56. The logic then ends, to recommence at start state 100 upon completion of the command.

In contrast, when no preamble is detected at decision diamond 118 during the wake up period, the receiver 40 is deenergized at block 120 for a long sleep, e.g., fifty four milliseconds. At this point, the clock frequency of the controller 56 is reduced to the low (e.g., 30 KHz) speed at block 122, and the logic loops back to decision diamond 102 to return a positive test result at the end of the long sleep period.

In this way, the system 10 waits as long a time as possible between wake-up cycles of the receiver 40 to reduce power consumption, and yet is assured of detecting the first transmission that occurs.

The present invention also contemplates further logic in the controller 56 for adaptively establishing a noise threshold to account for changing levels of ambient rf noise. Generally, the comparator circuit and controller 56 shown in FIG. 2 ignore signals that have signal strengths below a nominal noise threshold. However, the noise threshold (above which a carrier must be detected to begin the above logic) can be adjusted as follows to account for changing ambient rf noise levels. Initially, when no control signals have been detected, the noise threshold for both filters 54, 60 is set relatively low. When the controller 56 determines that a false carrier has been detected, however (as might be indicated by attempting to process a signal without successfully decoding the signal), the controller 56 raises the noise threshold above which a carrier must be detected to activate the logic above.

While the particular LOW POWER RF CONTROL SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A control system for operating a component at least in part in response to a signal from a remote control device manipulable by a user, the system comprising:
    at least one receiver configured for processing a signal when being activated;
    at least one controller causing the receiver to be activated periodically during a wake-up event comprising at least an activation period (B, B', B") and deactivated if no signal is detected during the wake-up event;
    wherein the signal includes at least one preamble pulse (P) during a pre-synchronization cycle followed by at least a data command signal, and
    wherein the receiver is activated according to a series of wake-up events in such a way that, during the whole duration of a pre-synchronization cycle, the receiver is at least activated during two activation periods and at most two activation periods occur during one and a same preamble pulse.

2. The control system of claim 1 wherein:
    the at least one receiver is associated with the component and configured for processing the signal; and
    the at least one controller is associated with the component and controlling the receiver, the controller causing the receiver to be energized according to an energization paradigm selected from the group consisting of:
        energizing for a first energized period, then deenergizing for a short period if no preamble pulse is detected, then energizing for a second energized period, and then deenergizing, at least if no preamble pulse is detected, for period longer than the short period, prior to reenergizing the receiver; and
        energizing for a first time period and then energizing for a second time period after a rest period the length of which ensures detection, in at least one of the time periods, of a preamble pulse if a preamble has been generated;
        wherein when the receiver is energized during an off period of an existing preamble, the receiver can be energized a second time after a rest period, the length of which ensures detection in at least one of the time periods of a preamble pulse,
    wherein when the controller causes the receiver to be energized, an activation duration of the receiver is substantially shorter than the period of a preamble pulse.

3. The system of claim 2, wherein each preamble pulse has a duty cycle in excess of fifty percent (50%).

4. The system of claim 3, wherein the signal includes at least six preamble pulses.

5. The system of claim 2, comprising a fast filter and a slow filter each electrically interposed between the receiver and controller.

6. The system of claim 2, wherein the controller operates at a low clock frequency during at least most of the long period and at a high clock frequency at least when the receiver is energized.

7. The system of claim 6, wherein the controller operates at an intermediate frequency between the low and high frequencies just prior to energizing the receiver after the long period.

8. The system of claim 2, comprising at least one bypass capacitor electrically connected to the receiver and to ground, the bypass capacitor having a capacitance of below five hundred picoFarads (500 pF).

9. The system of claim 8, comprising plural bypass capacitors, at least one having a capacitance not substantially more than one hundred picoFarads (100 pF).

10. The system of claim 2, comprising at least one surface acoustic wave (SAW) resonator circuit establishing an intermediate frequency (IF) oscillator for the receiver.

11. The system of claim 10, comprising an LC filter associated with the receiver for filtering an IF signal.

12. The system of claim 2, wherein the component is powered by at least one battery, and the system further comprises a DC-DC down converter electrically interposed between the battery and receiver to provide a voltage to the receiver.

13. The system of claim 2; comprising the component and a motor coupled to an operator of a component and controlled by the controller, the component being selected from the group of components consisting of window coverings, awnings, skylight covers, and screens.

14. The system of claim 2, wherein the controller adaptively adjusts a noise threshold above which a carrier must be detected to indicate the presence of a control signal.

15. The system of claim 2, wherein the controller causes the receiver to be energized according to the following paradigm: energizing for a first energized period, then deenergizing for a short period if no preamble signal is detected, then energizing for a second energized period, and then deenergizing, at least if no preamble signal is detected, for period longer than the short period, prior to reenergizing the receiver.

16. The system of claim 2, wherein the controller causes the receiver to be energized according to the following paradigm: energizing for a first time period and then energizing for a second time period after a staggered rest period the length of which equals an integer multiple of one-half of a pulse period plus or minus a time delta, the time delta being less than one-half the pulse period.

17. The system of claim 2, wherein the controller causes the receiver to be energized according to the following paradigm: energizing the receiver once sometime within a period of a relatively long preamble pulse.

18. The system of claim 2, wherein the activation duration is approximately 80 microseconds when the period of the preamble pulse is approximately 5000 microseconds.

19. The control system of claim 1 wherein:
the at least one receiver is associated with the component and configured for processing the signal; and
the at least one controller is associated with the component and controlling the receiver,
wherein the controller operates at a low clock frequency during at least most of a receiver sleep period and at a high clock frequency at least when the receiver is energized.

20. The system of claim 19, wherein the controller operates at an intermediate frequency between the low and high frequencies just prior to energizing the receiver after the receiver sleep period.

21. The system of claim 19, wherein the signal includes a preamble including plural pulses, each having a duty cycle in excess of fifty percent (50%).

22. The system of claim 21, wherein the preamble includes at least six pulses.

23. The system of claim 19, comprising a fast filter and a slow filter each electrically interposed between the receiver and controller.

24. The system of claim 19, comprising at least one bypass capacitor electrically connected to the receiver and to ground, the bypass capacitor having a capacitance of below five hundred picoFarads (500 pF).

25. The system of claim 24, comprising plural bypass capacitors, at least one having a capacitance not substantially more than one hundred picoFarads (100 pF).

26. The system of claim 19, comprising at least one surface acoustic wave (SAW) resonator circuit establishing an intermediate frequency (IF) oscillator for the receiver.

27. The system of claim 26, comprising an LC filter associated with the receiver for filtering an IF signal.

28. The system of claim 19, wherein the component is powered by at least one battery, and the system further comprises a DC-DC down converter electrically interposed between the battery and receiver to provide a voltage to the receiver.

29. The system of claim 19, comprising the component and a motor coupled to an operator of a component and controlled by the controller, the component being selected from the group of components consisting of window coverings, awnings, skylight covers, and screens.

30. The system of claim 19, wherein the controller adaptively adjusts a noise threshold above which a carrier must be detected to indicate the presence of a control signal.

31. The control system of claim 1 wherein:
the at least one receiver is associated with the component and configured for processing the signal;
the at least one controller is associated with the component and controlling the receiver; and
the system further comprises at least one bypass capacitor electrically connected to the receiver and to ground, the bypass capacitor having a capacitance of below five hundred picoFarads (500 pF),
wherein when the controller causes the receiver to be energized, wherein when the receiver is energized during an off period of an existing preamble, the receiver can be energized a second time after a rest period, the length of which ensures detection in at least one of the time periods of a preamble pulse, and an activation duration of the receiver is substantially shorter than the period of a preamble pulse.

32. The system of claim 31, comprising plural bypass capacitors, at least one having a capacitance not substantially more than one hundred picoFarads (100 pF).

33. The system of claim 31, wherein the signal includes a preamble including plural pulses, each having a duty cycle in excess of fifty percent (50%).

34. The system of claim 33, wherein the preamble includes at least six pulses.

35. The system of claim 31, comprising a fast filter and a slow filter each electrically interposed between the receiver and controller.

36. The system of claim 31, wherein the controller operates at a low clock frequency during at least most of a long receiver sleep period and at a high clock frequency at least when the receiver is energized.

37. The system of claim 36, wherein the controller operates at an intermediate frequency between the low and high frequencies just prior to energizing the receiver after the long receiver sleep period.

38. The system of claim 31, comprising at least one surface acoustic wave (SAW) resonator circuit establishing an intermediate frequency (IF) oscillator for the receiver.

39. The system of claim 38, comprising an LC filter associated with the receiver for filtering an IF signal.

40. The system of claim 31, wherein the component is powered by at least one battery, and the system further comprises a DC-DC down converter electrically interposed between the battery and receiver to provide a voltage to the receiver.

41. The system of claim 31, comprising the component and a motor coupled to an operator of a component and controlled by the controller, the component being selected from the group of components consisting of window coverings, awnings, skylight covers, and screens.

42. The system of claim 31, wherein the controller adaptively adjusts a noise threshold above which a carrier must be detected to indicate the presence of a control signal.

43. The control system of claim 1 wherein:
the at least one receiver is associated with the component and configured for processing the signal;
the at least one controller is associated with the component and controlling the receiver; and
the system further comprises at least one surface acoustic wave (SAW) resonator circuit establishing an intermediate frequency (IF) oscillator for the receiver, wherein the preamble pulse is not a data command signal, wherein when the controller causes the receiver to be energized, wherein when the receiver is energized during an off period of an existing preamble, the receiver can be energized a second time after a rest period, the length of which ensures detection in at least one of the time periods of a preamble pulse, and an activation duration of the receiver is substantially shorter than the period of a preamble pulse.

44. The system of claim 43, comprising an LC filter associated with the receiver for filtering an IF signal.

45. The system of claim 43, wherein the signal includes a preamble including plural pulses, each having a duty cycle in excess of fifty percent (50%).

46. The system of claim 45, wherein the preamble includes at least six pulses.

47. The system of claim 43, comprising a fast filter and a slow filter each electrically interposed between the receiver and the controller.

48. The system of claim 43, wherein the controller operates at a low clock frequency during at least most of a long sleep period and at a high clock frequency at least when the receiver is energized.

49. The system of claim 48, wherein the controller operates at an intermediate frequency between the low and high frequencies just prior to energizing the receiver after the long period.

50. The system of claim 43, comprising at least one bypass capacitor electrically connected to the receiver and to ground, the bypass capacitor having a capacitance of below five hundred picoFarads (500 pF).

51. The system of claim 50, comprising plural bypass capacitors, at least one having a capacitance not substantially more than one hundred picoFarads (100 pF).

52. The system of claim 43, wherein the component is powered by at least one battery, and the system further comprises a DC-DC down converter electrically interposed between the battery and receiver to provide a voltage to the receiver.

53. The system of claim 43, comprising the component and a motor coupled to an operator of a component and controlled by the controller, the component being selected from the group of components consisting of window coverings, awnings, skylight covers, and screens.

54. The system of claim 43, wherein the controller adaptively adjusts a noise threshold above which a carrier must be detected to indicate the presence of a control signal.

55. The control system of claim 1 wherein:
the at least one receiver is associated with the component and configured for processing the signal;
the at least one controller is associated with the component and controlling the receiver; and
the system further comprises a DC-DC down converter electrically interposed between a battery and receiver to provide a voltage to the receiver,
wherein when the controller causes the receiver to be energized, wherein when the receiver is energized during an off period of an existing preamble, the receiver can be energized a second time after a rest period, the length of which ensures detection in at least one of the time periods of a preamble pulse, and an activation duration of the receiver is substantially shorter than the period of a preamble pulse.

56. The system of claim 55, wherein the signal includes a preamble including plural pulses, each having a duty cycle in excess of fifty percent (50%).

57. The system of claim 56, wherein the preamble includes at least six pulses.

58. The system of claim 57, comprising a fast filter and a slow filter each electrically interposed between the receiver and the controller.

59. The system of claim 55, wherein the controller operates at a low clock frequency during at least most of a long period and at a high clock frequency at least when the receiver is energized.

60. The system of claim 59, wherein the controller operates at an intermediate frequency between the low and high frequencies just prior to energizing the receiver after the long period.

61. The system of claim 55, comprising at least one bypass capacitor electrically connected to the receiver and to ground, the bypass capacitor having a capacitance of below five hundred picoFarads (500 pF).

62. The system of claim 61, comprising plural bypass capacitors, at least one having a capacitance not substantially more than one hundred picoFarads (100 pF).

63. The system of claim 55, comprising at least one surface acoustic wave (SAW) resonator circuit establishing an intermediate frequency (IF) oscillator for the receiver.

64. The system of claim 63, comprising an LC filter associated with the receiver for filtering an IF signal.

65. The system of claim 55, wherein the component is powered by at least one battery, and the system further comprises a DC-DC down converter electrically interposed between the battery and receiver to provide a voltage to the receiver.

66. The system of claim 55, comprising the component and a motor coupled to an operator of a component and controlled by the controller, the component being selected from the group of components consisting of window coverings, awnings, skylight covers, and screens.

67. The system of claim 55, wherein the controller adaptively adjusts a noise threshold above which a carrier must be detected to indicate the presence of a control signal.

68. The control system of claim 1 wherein:
the at least one receiver is associated with the component and configured for processing the signal; and
the at least one controller is associated with the component and controlling the receiver,
wherein the controller adaptively adjusts a noise threshold above which a carrier must be detected to indicate the presence of a control signal.

69. The system of claim 68, wherein the controller operates at an intermediate frequency between low and high frequencies just prior to energizing the receiver after a receiver sleep period.

70. The system of claim 68, wherein the signal includes a preamble including plural pulses, each having a duty cycle in excess of fifty percent (50%).

71. The system of claim 70, wherein the preamble includes at least six pulses.

72. The system of claim 68, comprising a fast filter and a slow filter each electrically interposed between the receiver and controller.

73. The system of claim 68, comprising at least one bypass capacitor electrically connected to the receiver and to ground, the bypass capacitor having a capacitance of below five hundred picoFarads (500 pF).

74. The system of claim 73, comprising plural bypass capacitors, at least one having a capacitance not substantially more than one hundred picoFarads (100 pF).

75. The system of claim 68, comprising at least one surface acoustic wave (SAW) resonator circuit establishing an intermediate frequency (IF) oscillator for the receiver.

76. The system of claim 75, comprising an LC filter associated with the receiver for filtering an IF signal.

77. The system of claim 68, wherein the component is powered by at least one battery, and the system further comprises a DC-DC down converter electrically interposed between the battery and receiver to provide a voltage to the receiver.

78. The system of claim 68, comprising the component and a motor coupled to an operator of a component and controlled by the controller, the component being selected from the group of components consisting of window coverings, awnings, skylight covers, and screens.

79. The control system of claim 1, wherein the time period between the end of a first wake-up event and the beginning of a subsequent wake-up event is superior to 70% of the whole duration of the pre-synchronization cycle.

* * * * *